United States Patent
Netti et al.

(10) Patent No.: US 6,187,851 B1
(45) Date of Patent: Feb. 13, 2001

(54) SURFACE PROTECTIVE LAYER FOR MATERIALS

(75) Inventors: Stefano Netti, Bari; Camillo Di Carlo, Pescara, both of (IT)

(73) Assignee: Ausimont S.p.A. (IT)

(*) Notice: Under 35 U.S.C. 154(b), the term of this patent shall be extended for 0 days.

(21) Appl. No.: 09/344,103

(22) Filed: Jun. 24, 1999

Related U.S. Application Data

(62) Division of application No. 08/636,672, filed on Apr. 23, 1996, now Pat. No. 5,945,169.

(30) Foreign Application Priority Data

Apr. 24, 1995 (IT) .............................. MI95A0832

(51) Int. Cl.$^7$ .............................. C08K 3/34; C08K 3/36; C08L 27/12; B32B 27/00
(52) U.S. Cl. .................... 524/442; 524/456; 524/492; 524/493; 524/520; 524/544; 524/545; 428/421
(58) Field of Search .................... 524/442, 456, 524/520, 544, 545, 492, 493; 428/421

(56) References Cited

U.S. PATENT DOCUMENTS

| | | | |
|---|---|---|---|
| 3,779,854 | 12/1973 | Dukert et al. ................ | 156/307 |
| 3,833,368 | 9/1974 | Land et al. ................ | 96/3 |
| 4,299,869 | 11/1981 | Casson et al. ................ | 428/35 |
| 4,347,277 | 8/1982 | Slama et al. ................ | 428/215 |
| 4,395,445 | * 7/1983 | Sebauer et al. ................ | 524/520 |
| 4,409,354 | * 10/1983 | Namba et al. ................ | 524/431 |
| 4,499,146 | 2/1985 | Piacenti et al. ................ | 428/422 |
| 4,521,596 | * 6/1985 | Yoshimura et al. ................ | 524/492 |
| 4,680,331 | 7/1987 | Suzuki et al. ................ | 524/269 |
| 4,745,009 | 5/1988 | Piacenti et al. ................ | 427/393.5 |
| 4,764,431 | 8/1988 | Piacenti et al. ................ | 428/421 |
| 4,956,419 | 9/1990 | Kolb et al. ................ | 525/342 |
| 5,514,461 | 5/1996 | Meguro et al. ................ | 428/310.5 |
| 5,945,169 | * 8/1999 | Netti et al. ................ | 427/421 |

FOREIGN PATENT DOCUMENTS

| | | |
|---|---|---|
| 0 479 240 | 4/1992 | (EP) . |
| 0 494 082 | 7/1992 | (EP) . |
| 60-082242 | 5/1985 | (JP) . |
| 3051121 | 3/1991 | (JP) . |
| 5059202 | 3/1993 | (JP) . |
| WO92/10309 | 6/1992 | (WO) . |

OTHER PUBLICATIONS

A. C. West et al., "Fluorinated Elastomers", Encyclopedia of Chemical Technology, of Kirk–Othmer, vol. 8, pp. 500–515, 1979.

B. Bonardelli, et al., "Glass Transition Temperature of Copolymer and Terpolymer Fluoroelastomers", Polymer of Butterworth & Co., Ltd., vol. 27, p. 905, 1986.

G. Moggi et al., "Copolymers of 1, 1–Difluoroethene with Tetrafluoroethene Chlorotrifluoroethene, and Bromotrifluoroethane", Journal of Polymer Science: Polymer Physics Edition of John Wiley & Sons, Inc., vol. 22, pp. 357–365, 1984.

* cited by examiner

*Primary Examiner*—Peter A. Szekely
(74) *Attorney, Agent, or Firm*—Finnegan, Henderson, Farabow, Garrett & Dunner, L.L.P.

(57) ABSTRACT

An aqueous composition useful for the surface treatment of materials, which includes: (a) an inorganic silicate or colloidal silica present in an amount from 2 to 95% by weight based on the weight of dry product; and (b) a fluoroelastomer based on vinylidene fluoride (VDF) present in an amount from 5 to 98% by weight based on the weight of dry product.

9 Claims, No Drawings

SURFACE PROTECTIVE LAYER FOR MATERIALS

This is a division of application Ser. No. 08/636,672, filed Apr. 23, 1996 now U.S. Pat. No. 5,945,169 which is incorporated herein by reference.

BACKGROUND OF THE INVENTION

1. Field of the Invention

The present invention relates to a process for the surface treatment of materials, in particular of stony materials, marble, sandstone, bricks, concretes and the like, and of metals, and to aqueous compositions employed therein.

1. Description of the Related Art

As is known, stony materials, marble, sandstone, bricks and concretes, usually employed in building industry, and also metals, suffer from a progressive decay owing to the atmospheric agents and pollutants. Such decay is determined by a series of phenomena both of physical and chemical nature which mainly occur in the presence of water. In order to eliminate or at least meaningfully reduce, such phenomena, it is known to apply on the surface of such materials protective substances of various kinds (see "Stone Decay and Conservation", of Amoroso e Fassina, Elsewier Ed., Amsterdam, 1983).

If these decay phenomena have induced the formation of a surface layer having poor cohesion, it is essential that the applied substances, besides acting as protective agents, also exert a surface aggregating action.

Briefly, a good aggregating/protective agent, to perform the desired action and not to contemporaneously induce side decay phenomena or other undesired secondary effects, must show the following characteristics:

1. to markedly reduce the inlet and the penetration rate of water inside the material to be protected and consolidated;
2. to re-establish the cohesion between the particles of the surface layer of the decayed material, as well as the adhesion between the surface layer and the integral underlying part;
3. to impart an oil-repellence effect so as to reduce the penetration of oils and hydrocarbons, commonly present as atmospheric pollutants, or at least to make their removal from the material easier;
4. to show suitable chemical stability with respect to the action of the atmospheric agents, of light and of heat;
5. to maintain elasticity properties in order to avoid the formation of a stiff surface layer with mechanical properties different with respect to the subtratum;
6. to show chemical inertia towards the material to be treated;
7. not to alter, where required, the chromaticity of the material to be treated;
8. to maintain over time its own characteristics of solubility to assure the treatment reversibility;
9. to maintain a sufficient permeability to air and to steam, in order to avoid, because of the condensate, alteration phenomena under the protected surface layer.

In the class of fluorinated polymers, the use of perfluoropolyoxyalkylenes as protective agents for stony and cement manufactured articles, as described in U.S. Pat. No. 4,499,146 and U.S. Pat. No. 4,745,009, is known. Such products, even though they solve the problem of the protection, cannot however exert an effective consolidating action because of their nature of fluids.

A substantial improvement has been obtained by using elastomeric polymers based on vinylidene fluoride (VDF), which effectively exert both a protective and aggregating function (see for instance U.S. Pat. No. 4,764,431). A further improvement has been obtained by using as aggregating/protective agents, mixtures consisting of a fluoroelastomer based on VDF and of a VDF non elastomeric homopolymer or copolymer, as described in EP patent EP-A-479,240.

The use of silica and inorganic silicates as reinforcing agents for both non fluorinated and fluorinated resins is also known. For instance, in U.S. Pat. No. 4,680,331 aqueous compositions are described, consisting of a fluorinated resin, in particular polytetrafluoroethylene (PTFE), a silicone emulsion, a flocky inorganic material and a non ionic surfactant, optionally in admixture with an anionic surfactant. Among the inorganic flocky materials $SiO_2$, $TiO_2$, $Al_2O_3$ and others are indicated. Such compositions are employed for the coating of glass or metal. To obtain a stable coating, the fluorinated resin must be submitted after the application to a sintering process at a temperature higher than the melting point of the resin itself, (for example higher than 320° C. in case of PTFE. The use of so high temperatures is a true drawback, both as it makes the process applicable only on manufactured thermally resistant articles of small sizes, and because of unavoidable decay phenomena of the silicone material.

The Applicant has now surprisingly found that the application of an aqueous composition, as defined hereinunder, comprising both a fluoreoelastomer and an inorganic compound of the silicon, allows one to obtain a remarkable improvement in surface protection and consolidation compared to the individual components when used separately. The synergistic effect of the combination of an inorganic compound of silicon and a fluoroelastomer is particularly surprising since, on the basis of experiments carried out by the Applicant, the application of an inorganic compound of silicon, for example sodium silicate, on a stony material while exerting a discrete consolidating action, does not produce any protective effect, since the silicate does not possess water-repellent properties.

SUMMARY OF THE INVENTION

An object of the present invention is therefore a process for the surface treatment of materials, in particular of stony materials, marble, sandstone, bricks, concretes and the like, and of metals, which comprises applying on the surface of said materials an aqueous composition comprising:

(a) from 2 to 95% by weight, preferably from 2 to 60%, even more preferably from 2 to 30% by weight based on the weight of the dry product of an inorganic compound selected from colloidal silica, silicates, of sodium, potassium, ammonium, alkali or alkaline-earth metals or mixtures thereof; and (b) from 5 to 98%, preferably from 40 to 98%, even more preferably from 70 to 98% by weight based on the weight of dry product of a fluoroelastomer based on vinylidene fluoride (VDF).

A further object of the present invention consists in the aqueous compositions as defined above.

By weight % on the dry product it is meant the amount of product present in the solid residue obtained after complete evacuation of the water and of other solvents optionally present.

DETAILED DESCRIPTION OF THE PREFERRED EMBODIMENTS

The total content of the components (a) and (b) in the aqueous composition is generally comprised between 1 and 15%, preferably between 2 and 10%, by weight/volume (grams per 100 ml of aqueous phase).

The silicates (a) are preferably sodium or potassium silicates, having a ratio by weight $SiO_2/Me_3O$ (Me=Na, K) comprised between 1.6 and 3.6, preferably from 2.8 and 3.6.

The fluoroelastomers based on VDF (b) are well known products in the art (see for instance Kirk-Othmer, "Encyclopedia of Chemical Technology", Vol. 8, pg. 500–515 (1979)). They are elastomeric copolymers comprising VDF, in amounts generally comprised between 35 and 85% by moles, preferably between 40 and 70% by moles, and at least another fluorinated comonomer ethylenically unsaturated. Examples of such comonomers are: trifluoroethylene, tetrafluoroethylene (TFE), trifluoropropene, hexafluoropropene (HFP), pentafluoropropene, chlorotrifluoroethylene (CTFE), perfluoroalkylvinylethers (PAVE), in particular perfluoromethylvinylether (PMVE) and perf luoropropylvinylether (PPVE). The copolymers comprising, by moles, from 55 to 85% of VDF, from 15 to 45% of HFP, from 0 to 30% of TFE, are particularly preferred. They are available on the market with different trade names, such as TECHNOFLON® (Ausimont), VITON® (DuPont), FLUOREL® (3M), DAIEL® (Daikin). Fluoroelastomers having high molecular weight, having a ponderal average molecular weight higher than 20,000, are particularly preferred. Ponderal average molecular weight is synonymous with weight-average molecular weight.

The aqueous phase of the compositions of the present invention can comprise, besides water, a polar organic solvent, in amounts generally comprised between 2 and 25% by weight, preferably between 3 and 10% by weight, with respect to the total weight of the composition. Such a solvent can be selected, for instance, from alcohols, ketones, esters, aliphatic ethers, such as: acetone, methylethylketone, ethylacetate, propylacetate, propanol, butanol, mono-methylether and di-methylether of the ethylene glycol, or their mixtures.

The aqueous compositions of the present invention can be prepared by mixing an aqueous solution of the silicate (a), or silica in colloidal form, and an aqueous dispersion of the fluoroelastomer (b). Such dispersion can be directly prepared by polymerization in aqueous emulsion, and then optionally diluted with demineralized water. Alternatively, other methods known in the art can be utilized, for instance the one described in Polymer, 27, P. 905 (1986). The dispersion can be stabilized by addition of a non-ionic sufactant, such as for instance TRITON®X 100 (nonylphenolethoxylate), whose concentration can generally range between 0 and 2% by weight with respect to the total weight of the dispersion.

In case the fluoroelastomer is the prevailing component, i.e., between 60 and 95% by weight based on the dry product, the compositions of the present invention can be prepared by mixing a solution or aqueous suspension of the inorganic compound of silicon with a solution of fluoroelastomer in a polar organic solvent, selected from the same classes indicated above.

It is generally preferred to add the aqueous solution or suspension of the silicon compound to the dispersion or solution of the fluoroelastomer, under mild stirring, to maintain the system homogeneous. The compositions thus obtained demonstrate a relatively high stability, and can be kept for a long time without separation of the polymer coagula.

In the compositions of the present invention the component (b) can consist of a mixture of the fluoro-elastomer described above and a non elastomeric homopolymer or copolymer based on VDF, as described in EP patent 479, 240. The amount of non elastomeric polymer can generally be comprised between 2 and 40% by weight with respect to the total weight of the polymeric components. Within non elastomeric VDF copolymers fall the copolymers based on VDF containing minor amounts of a fluoroolefin $C_2$-$C_8$, for instance VDF/HFP copolymers, with a content in HFP not higher than 10% by moles, preferably from 2 to 5% by moles, or VDF/TFE copolymers, with a content of TFE not higher than 35% by moles, preferably from 5 to 15% by moles. Such copolymers can be prepared in an aqueous dispersion as described for instance in J. Polymer Sci., Pol. Physic., Ed. 22, 357 (1984).

The application of the compostions of the present invention on the material to be treated can occur with any appropriate technique, such as, for instance, by brush, compressed air gun, by spray method or by immersion. The total amount of protective/consolidating agents (polymeric components and silicon compounds) employed for unity of surface depends on the physical characteristics of the surface itself, such as for instance the porosity and the disaggregation state; the higher the porosity and the disaggregation state are, the higher shall be the amount of protective/consolidating agents to be applied. The amount may be, comprised between 5 and 150 $g/m^2$, preferably from 10 to 50 $g/m^2$.

The compostions of the present invention, besides consolidating and protecting from atmospheric agents and pollutants, act as reversible anti-graffiti agents. Indeed, their application hinders the penetration of the most common spray paints, wherefore, thanks to the reversibility of the treatment, the graffiti can be easily removed by means of common organic solvents, for instance esters or ketones, such as acetone, methylethylketone, ethyl acetate or their mixtures. With suitable expedients, for instance selecting the suitable solvent, it is possible to remove the graffiti alone or together with the protective layer ("sacrificial protection").

Another possible application of the compositions object of the present invention is as encapsulating agents for toxic materials or which however must be isolated from the surrounding environment (for instance lead or asbestos).

Some working examples of the present invention are reported hereinafter, whose purpose is merely illustrative but not limitative of the scope of the invention itself.

EXAMPLES 1–10

It was prepared:
SOLUTION A: 27 g of 37% sodium silicate ($SiO_2/Na_2O$ ratio=3.2, a commercially available product of Ausimont) dissolved in 100 ml of water; and
DISPERSION A: 33 g of 30% by weight aqueous dispersion of TECHNOFION® TN (fluoroelastomer produced by Ausimont consisting, by moles, of 65% of VDF, 16% of HFP, 19% of TFE, with ponderal average molecular weight equal to about 55,000) diluted with 100 ml of water.
The following compositions were then prepared:
COMPOSITION 1: after dilution, the solution A was gradually added to the dispersion A, under mild stirring, in such amount as to obtain a ratio by weight between silicate and fluoroelastomer equal to 40:60 and an amount of dry product equal to 10% by weight.
COMPOSITION 2: similarly to the composition 1, the solution A and the dispersion A were mixed such as to obtain a weight ratio between silicate and fluoroelastomer equal to 20:80 and an amount of dry product equal to 10% by weight.

COMPOSITION 3: similarly to the composition 1, the solution A and the dispersion A were mixed such as to obtain a weight ratio between silicate and fluoroelastomer equal to 30:70 and an amount of dry product equal to 10% by weight.

The dry amount is expressed as % by weight/volume, i.e. grams of solid components per 100 ml of aqueous phase.

The compositions 1 and 2 and, for comparative purposes, the solution A and the dispersion A were brush applied only on one side of samples having 5×5×2 cm sizes of Pietra di Lecce (calcareous rock having porosity comprised between 33% and 43%), in the amounts indicated in Table 1.

On each sample treated in this way the protective effectiveness, according to the capillarity method, described for instance by P. Tiano in l "Edilizia", pag. 109–127, 1987, was determined. The method consists in measuring, after drying of the samples at room temperature until constant weight, the amount of water absorbed for unity of surface. By taking as reference an untreated sample, the protective effectiveness (E.P. %) is calculated as follows:

$$E.P. \% = (A-B)/A*100$$

wherein A is the percent weight increase of the untreated sample, B that of the treated sample.

The obtained results, averaged on 5 samples, are reported in Table 1. It can be noticed how, the total amount of applied products for unity of surface being equal, the combination of silicate and fluoroelastomer leads to a protective effectiveness markedly higher with respect to the two products separately applied.

Other samples of the same Pietra di Lecce were treated as described above with the compositions 1 and 3, and, for comparative purposes, with the solution A and the dispersion A. The aggregative effectiveness was then determined thereon, according to the method described in U.S. Pat. No. 4,764,431. Such method consists in measuring on the samples, previously dried at room temperature until constant weight, the loss in weight after abrasive treatment. By taking as reference an untreated sample, the aggregative effectiveness (E.A. %) is calculated as follows:

$$E.A. \% = (R-S)/R*100$$

wherein R is the loss in weight for unity of surface of the untreated sample, S that of the treated sample.

The obtained results, averaged on 5 samples, are reported in Table 2. Also in this case it can be noticed how, the total amount of applied products for unity of surface being equal, the combination of silicate and fluoroelastomer leads to an aggregative effectiveness markedly higher with respect to the two products separately applied.

EXAMPLES 11–15

It was prepared:

SOLUTION A: 20.3 g of 37% sodium silicate ($SiO_2$/$Na_2O$ ratio=3.2, a commercially available product of Ausimont) dissolved in 100 ml of water; and DISPERSION A: 25 g of a 30% by weight aqueous dispersion of the same TECHNOFLON® TN used in the dispersion A, diluted with 100 ml of water.

The following compositions were then prepared:

COMPOSITION 4: after dilution, the solution B was gradually added to the dispersion B, under mild stirring, in such amount as to obtain a ratio by weight between silicate and fluoroelastomer equal to 40:60 and an amount of dry product equal to 7.5% by weight.

COMPOSITION 5: similarly to the composition 1, the solution B and the dispersion B were mixed such as to obtain a weight ratio between silicate and fluoroelastomer equal to 20:80 and an amount of dry product equal to 7.5% by weight.

The compositions 4 and 5 and, for comparative purposes, the solution B and the dispersion B were brush applied only on one side of samples having 5×5×2 cm sizes of plaster based on water lime having porosity equal to about 31%, carried out with a mixture consisting of 68% by weight of sand, with granules having sizes smaller than 0.9 mm, of 20% by weight of water lime, the remaining 11% by weight being water. The applied amounts are indicated in Table 3.

On each sample treated in this way the aggregative effectiveness, according to the method described above, was determined. The obtained results, averaged on 5 samples, are reported in Table 3. Also in this case a marked synergistic effect between silicate and fluoroelastomer can be noticed.

EXAMPLES 16–20

By utilizing the compositions 1 and 2 and, for comparative purposes, the solution A and the dispersion A of Examples 1–10, samples of concrete having 5×5×5 cm sizes were treated as described above. Such samples were prepared by utilizing concrete material commercially available the trade name CLS 0,65 with water/ordinary Portland cement/sand (0–5 mm)/aggregates (5–20 mm) equal to 65/1/2.8/4. Before the treatment the samples were aged for 3 months, and then kept in stove for 2 days at 60° C. The applied amounts are indicated in table 4.

On each sample treated in this way the protective effectiveness, according to the method described above, was determined. The obtained results, averaged on 5 samples, are reported in Table 4. Also in this case a marked synergistic effect between silicate and fluoroelastomer can be noticed.

TABLE 1

| EX. | TREATED MATERIAL | APPLIED COMPOSITION | TOTAL AMOUNT APPLIED PRODUCTS ($g/m^2$) | AMOUNT APPLIED SILICATE ($g/m^2$) | AMOUNT APPLIED FLUOROELASTOMER ($g/m^2$) | ABSORBED WATER ($g/m^2$) | E.P. (%) |
|---|---|---|---|---|---|---|---|
| 1* | Pietra | — | — | — | — | 0.140 | — |
| 2 | di | COMP. 1 | 15 | 6 | 9 | 0.021 | 85 |
| 3 | Lecce | COMP. 2 | 15 | 3 | 12 | 0.031 | 78 |
| 4* |  | SOL. A | 15 | 15 | — | 0.098 | 30 |
| 5* |  | DISP. A | 15 | — | 15 | 0.042 | 70 |

*comparative examples

TABLE 2

| EX. | TREATED MATERIAL | APPLIED COMPOSITION | TOTAL AMOUNT APPLIED PRODUCTS ($g/m^2$) | AMOUNT APPLIED SILICATE ($g/m^2$) | AMOUNT APPLIED FLUOROELASTOMER ($g/m^2$) | LOSS IN WEIGHT ($g/m^2$) | E.A. (%) |
|---|---|---|---|---|---|---|---|
| 6* | Pietra | — | — | — | — | 145 | — |
| 7 | di | COMP. 1 | 15 | 6 | 9 | 32 | 78 |
| 8 | Lecce | COMP. 2 | 15 | 4.5 | 10.5 | 22 | 85 |
| 9* |  | SOL. A | 15 | 15 | — | 83 | 45 |
| 10* |  | DISP. A | 15 | — | 15 | 41 | 72 |

*comparative examples

TABLE 3

| EX. | TREATED MATERIAL | APPLIED COMPOSITION | TOTAL AMOUNT APPLIED PRODUCTS ($g/m^2$) | AMOUNT APPLIED SILICATE ($g/m^2$) | AMOUNT APPLIED FLUOROELASTOMER ($g/m^2$) | LOSS IN WEIGHT ($g/m^2$) | E.A. (%) |
|---|---|---|---|---|---|---|---|
| 11* | Plaster | — | — | — | — | 740 | — |
| 12 | based on | COMP. 4 | 25 | 10 | 15 | 163 | 78 |
| 13 | water | COMP. 5 | 25 | 5 | 20 | 111 | 85 |
| 14* | lime | SOL. B | 25 | 25 | — | 444 | 40 |
| 15* |  | DISP. B | 25 | — | 25 | 207 | 72 |

*comparative examples

TABLE 4

| EX. | TREATED MATERIAL | APPLIED COMPOSITION | TOTAL AMOUNT APPLIED PRODUCTS ($g/m^2$) | AMOUNT APPLIED SILICATE ($g/m^2$) | AMOUNT APPLIED FLUOROELASTOMER ($g/m^2$) | ABSORBED WATER ($g/m^2$) | E.P. (%) |
|---|---|---|---|---|---|---|---|
| 16* | CLS 0,65 | — | — | — | — | 0.082 | — |
| 17 |  | COMP. 1 | 15 | 6 | 9 | 0.019 | 77 |
| 18 |  | COMP. 2 | 15 | 3 | 12 | 0.023 | 72 |
| 19* |  | SOL. A | 15 | 15 | — | 0.062 | 25 |
| 20* |  | DISP. A | 15 | — | 15 | 0.029 | 65 |

*comparative examples

What is claimed is:

1. An aqueous composition consisting essentially of:
(a) an inorganic compound selected from colloidal silica, silicates of sodium, potassium, ammonium, alkali or alkaline earth metals or mixtures thereof, present in an amount from 2 to 95% by weight, based on the weight of the dry product; and
(b) a fluoroelastomer consisting essentially of vinylidene fluoride (VDF) and at least another ethylenically unsaturated fluorinated comonomer, or a mixture of fluoroelastomers, consisting of vinylidene fluoride (VDF) and at least another ethylenically unsaturated fluorinated comonomer, and a non-elastomeric homopolymer of VDF or a non-elastomeric VDF copolymer consisting of vinylidene fluoride (VDF) and at least another ethylenically unsaturated fluorinated comonomer, present in an amount from 5 to 98% by weight based on the weight of the dry product, wherein the VDF monomer is present in an amount between 35 and 85% by moles.

2. A composition according to claim 1, wherein component (a) is present in an amount from 2 to 60% by weight based on the weight of the dry product and component (b) is present in an amount from 40 to 98% by weight based on the weight of the dry product.

3. A composition according to claim 2, wherein component (a) is present in an amount from 2 to 30% by weight based on the weight of the dry product and component (b) is present in an amount from 70 to 98% by weight based on the weight of dry product.

4. A composition according to any one of claims 1 to 3, wherein the total content of components (a) and (b) in the aqueous composition is comprised between 1 and 15% as measured by grams per 100 ml of aqueous phase.

5. A composition according to any one of claims 1 to 3, wherein the component (a) is a sodium or potassium silicate, having a weight ratio of $SiO_2/Me_2O$ comprised between 1.6 and 3.6 wherein Me is Na or K.

6. A composition according to any one of claims 1 to 3, wherein component (b) is a mixture of a fluoroelastomer consisting of VDF and a comonomer, said mixture comprising, by moles, from 55 to 85% VDF, from 15 to 45% hexafluoropropene (HFP), and from 0 to 30% tetrafluoroethylene (TFE).

7. A composition according to claim 1, wherein the non-elastomeric VDF homopolymer or copolymer is present in amounts comprised between 2 and 40% by weight with respect to the total weight of component (b).

8. A composition according to any one of claims 1 to 3, wherein the aqueous composition comprises, in addition to water, a polar organic solvent, in amounts comprised between 2 and 25% by weight with respect to the total weight of the composition.

9. The composition according to any one of claims 1 to 3, wherein the aqueous composition is applied to a material selected from the group consisting of stony materials, marble, sandstone, bricks, concretes, and metals.

* * * * *